United States Patent
Ciuc et al.

(10) Patent No.: US 7,865,036 B2
(45) Date of Patent: *Jan. 4, 2011

(54) METHOD AND APPARATUS OF CORRECTING HYBRID FLASH ARTIFACTS IN DIGITAL IMAGES

(75) Inventors: Mihai Ciuc, Bucharest (RO); Adrian Capata, Bucharest (RO); Florin Nanu, Bucharest (RO); Eran Steinberg, San Francisco, CA (US); Peter Corcoran, Claregalway (IE)

(73) Assignee: Tessera Technologies Ireland Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 12/558,859

(22) Filed: Sep. 14, 2009

(65) Prior Publication Data

US 2010/0040284 A1   Feb. 18, 2010

Related U.S. Application Data

(63) Continuation of application No. 11/282,955, filed on Nov. 18, 2005, now Pat. No. 7,599,577.

(51) Int. Cl.
*G06K 9/40* (2006.01)
(52) U.S. Cl. .................. 382/275; 382/167; 382/103; 382/117
(58) Field of Classification Search .............. 382/275, 382/167, 165, 103, 117, 209, 254, 173; 348/241, 348/222.1
See application file for complete search history.

(56) References Cited

U.S. PATENT DOCUMENTS

| | | | |
|---|---|---|---|
| 4,285,588 A | 8/1981 | Mir | |
| 4,577,219 A | 3/1986 | Klie et al. | |
| 4,646,134 A | 2/1987 | Komatsu et al. | |
| 4,777,620 A | 10/1988 | Shimoni et al. | |
| 4,881,067 A | 11/1989 | Watanabe et al. | |

(Continued)

FOREIGN PATENT DOCUMENTS

EP      884694 A1    12/1998

(Continued)

OTHER PUBLICATIONS

Comber, Nathalie et al., "Removal of Defects on Flash Radiographic Images by Fuzzy Combination, Conference: Machine Vision Applications in Industrial Inspection III, http://rlinks2.dialog.com/NASApp/ChannelWEB/DialogProServlet?ChName=engineering", Proceedings of SPIE—The International Society for Optical Engineering, Society of Photo-Optical Instrumentation, 1995, pp. 301-312.

(Continued)

*Primary Examiner*—Anh Hong Do
(74) *Attorney, Agent, or Firm*—Andrew V. Smith

(57) ABSTRACT

A method for digital image eye artifact detection and correction include identifying one or more candidate red-eye defect regions in an acquired image. For one or more candidate red-eye regions, a seed pixels and/or a region of pixels having a high intensity value in the vicinity of the candidate red-eye region is identified. The shape, roundness or other eye-related characteristic of a combined hybrid region including the candidate red-eye region and the region of high intensity pixels is analyzed. Based on the analysis of the eye-related characteristic of the combined hybrid region, it is determined whether to apply flash artifact correction, including red eye correction of the candidate red-eye region and/or correction of the region of high intensity pixels.

42 Claims, 2 Drawing Sheets

U.S. PATENT DOCUMENTS

| | | | |
|---|---|---|---|
| 4,978,989 A | 12/1990 | Nakano et al. |
| 5,016,107 A | 5/1991 | Sasson et al. |
| 5,070,355 A | 12/1991 | Inoue et al. |
| 5,130,789 A | 7/1992 | Dobbs et al. |
| 5,164,831 A | 11/1992 | Kuchta et al. |
| 5,164,833 A | 11/1992 | Aoki |
| 5,202,720 A | 4/1993 | Fujino et al. |
| 5,227,837 A | 7/1993 | Terashita |
| 5,231,674 A | 7/1993 | Cleveland et al. |
| 5,249,053 A | 9/1993 | Jain |
| 5,274,457 A | 12/1993 | Kobayashi et al. |
| 5,301,026 A | 4/1994 | Lee |
| 5,303,049 A | 4/1994 | Ejima et al. |
| 5,335,072 A | 8/1994 | Tanaka et al. |
| 5,384,601 A | 1/1995 | Yamashita et al. |
| 5,400,113 A | 3/1995 | Sosa et al. |
| 5,424,794 A | 6/1995 | McKay |
| 5,432,863 A | 7/1995 | Benati et al. |
| 5,432,866 A | 7/1995 | Sakamoto |
| 5,452,048 A | 9/1995 | Edgar |
| 5,455,606 A | 10/1995 | Keeling et al. |
| 5,537,516 A | 7/1996 | Sherman et al. |
| 5,568,187 A | 10/1996 | Okino |
| 5,568,194 A | 10/1996 | Abe |
| 5,649,238 A | 7/1997 | Wakabayashi et al. |
| 5,671,013 A | 9/1997 | Nakao |
| 5,678,073 A | 10/1997 | Stephenson, III et al. |
| 5,694,926 A | 12/1997 | DeVries et al. |
| 5,708,866 A | 1/1998 | Leonard |
| 5,719,639 A | 2/1998 | Imamura |
| 5,719,951 A | 2/1998 | Shackleton et al. |
| 5,721,983 A | 2/1998 | Furutsu |
| 5,724,456 A | 3/1998 | Boyack et al. |
| 5,734,425 A | 3/1998 | Takizawa et al. |
| 5,748,764 A | 5/1998 | Benati et al. |
| 5,748,784 A | 5/1998 | Sugiyama |
| 5,751,836 A | 5/1998 | Wildes et al. |
| 5,761,550 A | 6/1998 | Kancigor |
| 5,781,650 A | 7/1998 | Lobo et al. |
| 5,805,720 A | 9/1998 | Suenaga et al. |
| 5,805,727 A | 9/1998 | Nakano |
| 5,805,745 A | 9/1998 | Graf |
| 5,815,749 A | 9/1998 | Tsukahara et al. |
| 5,818,975 A | 10/1998 | Goodwin et al. |
| 5,847,714 A | 12/1998 | Naqvi et al. |
| 5,850,470 A | 12/1998 | Kung et al. |
| 5,862,217 A | 1/1999 | Steinberg et al. |
| 5,862,218 A | 1/1999 | Steinberg |
| 5,892,837 A | 4/1999 | Luo et al. |
| 5,949,904 A | 9/1999 | Delp |
| 5,974,189 A | 10/1999 | Nicponski |
| 5,990,973 A | 11/1999 | Sakamoto |
| 5,991,456 A | 11/1999 | Rahman et al. |
| 5,991,549 A | 11/1999 | Tsuchida |
| 5,991,594 A | 11/1999 | Froeber et al. |
| 5,999,160 A | 12/1999 | Kitamura et al. |
| 6,006,039 A | 12/1999 | Steinberg et al. |
| 6,009,209 A | 12/1999 | Acker et al. |
| 6,011,547 A | 1/2000 | Shiota et al. |
| 6,016,354 A | 1/2000 | Lin et al. |
| 6,028,611 A | 2/2000 | Anderson et al. |
| 6,035,072 A | 3/2000 | Read |
| 6,035,074 A | 3/2000 | Fujimoto et al. |
| 6,036,072 A | 3/2000 | Lee |
| 6,101,271 A | 8/2000 | Yamashita et al. |
| 6,104,839 A | 8/2000 | Cok et al. |
| 6,118,485 A | 9/2000 | Hinoue et al. |
| 6,134,339 A | 10/2000 | Luo |
| 6,151,403 A | 11/2000 | Luo |
| 6,172,706 B1 | 1/2001 | Tatsumi |
| 6,192,149 B1 | 2/2001 | Eschbach et al. |
| 6,195,127 B1 | 2/2001 | Sugimoto |
| 6,201,571 B1 | 3/2001 | Ota |
| 6,204,858 B1 | 3/2001 | Gupta |
| 6,204,868 B1 | 3/2001 | Yamauchi et al. |
| 6,233,364 B1 | 5/2001 | Krainiouk et al. |
| 6,249,315 B1 | 6/2001 | Holm |
| 6,252,976 B1 | 6/2001 | Schildkraut et al. |
| 6,266,054 B1 | 7/2001 | Lawton et al. |
| 6,268,939 B1 | 7/2001 | Klassen et al. |
| 6,275,614 B1 | 8/2001 | Krishnamurthy et al. |
| 6,278,491 B1 | 8/2001 | Wang et al. |
| 6,285,410 B1 | 9/2001 | Marni |
| 6,292,574 B1 | 9/2001 | Schildkraut et al. |
| 6,295,378 B1 | 9/2001 | Kitakado et al. |
| 6,298,166 B1 | 10/2001 | Ratnakar et al. |
| 6,300,935 B1 | 10/2001 | Sobel et al. |
| 6,381,345 B1 | 4/2002 | Swain |
| 6,393,148 B1 | 5/2002 | Bhaskar |
| 6,396,963 B2 | 5/2002 | Shaffer et al. |
| 6,407,777 B1 | 6/2002 | DeLuca |
| 6,421,468 B1 | 7/2002 | Ratnakar et al. |
| 6,426,775 B1 | 7/2002 | Kurokawa |
| 6,429,924 B1 | 8/2002 | Milch |
| 6,433,818 B1 | 8/2002 | Steinberg et al. |
| 6,438,264 B1 | 8/2002 | Gallagher et al. |
| 6,441,854 B2 | 8/2002 | Fellegara et al. |
| 6,459,436 B1 | 10/2002 | Kumada et al. |
| 6,473,199 B1 | 10/2002 | Gilman et al. |
| 6,496,655 B1 | 12/2002 | Malloy Desormeaux |
| 6,501,911 B1 | 12/2002 | Malloy Desormeaux |
| 6,505,003 B1 | 1/2003 | Malloy Desormeaux |
| 6,510,520 B1 | 1/2003 | Steinberg |
| 6,516,154 B1 | 2/2003 | Parulski et al. |
| 6,614,471 B1 | 9/2003 | Ott |
| 6,614,995 B2 | 9/2003 | Tseng |
| 6,621,867 B1 | 9/2003 | Sazzad et al. |
| 6,628,833 B1 | 9/2003 | Horie |
| 6,700,614 B1 | 3/2004 | Hata |
| 6,707,950 B1 | 3/2004 | Burns et al. |
| 6,714,665 B1 | 3/2004 | Hanna et al. |
| 6,718,051 B1 | 4/2004 | Eschbach |
| 6,724,941 B1 | 4/2004 | Aoyama |
| 6,728,401 B1 | 4/2004 | Hardeberg |
| 6,765,686 B2 | 7/2004 | Maruoka |
| 6,786,655 B2 | 9/2004 | Cook et al. |
| 6,792,161 B1 | 9/2004 | Imaizumi et al. |
| 6,798,913 B2 | 9/2004 | Toriyama |
| 6,859,565 B2 | 2/2005 | Baron |
| 6,873,743 B2 | 3/2005 | Steinberg |
| 6,885,766 B2 | 4/2005 | Held et al. |
| 6,895,112 B2 | 5/2005 | Chen et al. |
| 6,900,882 B2 | 5/2005 | Iida |
| 6,912,298 B1 | 6/2005 | Wilensky |
| 6,937,997 B1 | 8/2005 | Parulski |
| 6,967,680 B1 | 11/2005 | Kagle et al. |
| 6,980,691 B2 | 12/2005 | Nesterov et al. |
| 6,984,039 B2 | 1/2006 | Agostinelli |
| 7,024,051 B2 | 4/2006 | Miller et al. |
| 7,027,662 B2 | 4/2006 | Baron |
| 7,030,927 B2 | 4/2006 | Sasaki |
| 7,035,461 B2 | 4/2006 | Luo et al. |
| 7,035,462 B2 | 4/2006 | White et al. |
| 7,042,501 B1 | 5/2006 | Matama |
| 7,042,505 B1 | 5/2006 | DeLuca |
| 7,062,086 B2 | 6/2006 | Chen et al. |
| 7,116,820 B2 | 10/2006 | Luo et al. |
| 7,133,070 B2 | 11/2006 | Wheeler et al. |
| 7,155,058 B2 | 12/2006 | Gaubatz et al. |
| 7,171,044 B2 | 1/2007 | Chen et al. |
| 7,216,289 B2 | 5/2007 | Kagle et al. |
| 7,224,850 B2 | 5/2007 | Zhang et al. |
| 7,269,292 B2 | 9/2007 | Steinberg |
| 7,289,664 B2 | 10/2007 | Enomoto |

| | | |
|---|---|---|
| 7,295,233 B2 | 11/2007 | Steinberg et al. |
| 7,310,443 B1 | 12/2007 | Kris et al. |
| 7,315,631 B1 | 1/2008 | Corcoran et al. |
| 7,336,821 B2 | 2/2008 | Ciuc et al. |
| 7,352,394 B1 | 4/2008 | DeLuca et al. |
| 7,362,368 B2 | 4/2008 | Steinberg et al. |
| 7,369,712 B2 | 5/2008 | Steinberg et al. |
| 7,403,643 B2 | 7/2008 | Ianculescu et al. |
| 7,436,998 B2 | 10/2008 | Steinberg et al. |
| 7,454,040 B2 | 11/2008 | Luo et al. |
| 7,515,740 B2 | 4/2009 | Corcoran et al. |
| 7,599,577 B2 * | 10/2009 | Ciuc et al. .................. 382/275 |
| 7,630,006 B2 * | 12/2009 | DeLuca et al. ............... 348/241 |
| 7,804,531 B2 * | 9/2010 | DeLuca et al. ............... 348/241 |
| 2001/0015760 A1 | 8/2001 | Fellegara et al. |
| 2001/0031142 A1 | 10/2001 | Whiteside |
| 2001/0052937 A1 | 12/2001 | Suzuki |
| 2002/0019859 A1 | 2/2002 | Watanabe |
| 2002/0041329 A1 | 4/2002 | Steinberg |
| 2002/0051571 A1 | 5/2002 | Jackway et al. |
| 2002/0054224 A1 | 5/2002 | Wasula et al. |
| 2002/0085088 A1 | 7/2002 | Eubanks |
| 2002/0090133 A1 | 7/2002 | Kim et al. |
| 2002/0093577 A1 | 7/2002 | Kitawaki et al. |
| 2002/0093633 A1 | 7/2002 | Milch |
| 2002/0105662 A1 | 8/2002 | Patton et al. |
| 2002/0114513 A1 | 8/2002 | Hirao |
| 2002/0126893 A1 | 9/2002 | Held et al. |
| 2002/0131770 A1 | 9/2002 | Meier et al. |
| 2002/0136450 A1 | 9/2002 | Chen et al. |
| 2002/0141661 A1 | 10/2002 | Steinberg |
| 2002/0150292 A1 | 10/2002 | O'Callaghan |
| 2002/0150306 A1 | 10/2002 | Baron |
| 2002/0159630 A1 | 10/2002 | Buzuloiu et al. |
| 2002/0172419 A1 | 11/2002 | Lin et al. |
| 2002/0176623 A1 | 11/2002 | Steinberg |
| 2003/0007687 A1 | 1/2003 | Nesterov et al. |
| 2003/0021478 A1 | 1/2003 | Yoshida |
| 2003/0025808 A1 | 2/2003 | Parulski et al. |
| 2003/0025811 A1 | 2/2003 | Keelan et al. |
| 2003/0044063 A1 | 3/2003 | Meckes et al. |
| 2003/0044070 A1 | 3/2003 | Fuersich et al. |
| 2003/0044176 A1 | 3/2003 | Saitoh |
| 2003/0044177 A1 | 3/2003 | Oberhardt et al. |
| 2003/0044178 A1 | 3/2003 | Oberhardt et al. |
| 2003/0052991 A1 | 3/2003 | Stavely et al. |
| 2003/0058343 A1 | 3/2003 | Katayama |
| 2003/0058349 A1 | 3/2003 | Takemoto |
| 2003/0095197 A1 | 5/2003 | Wheeler et al. |
| 2003/0107649 A1 | 6/2003 | Flickner et al. |
| 2003/0113035 A1 | 6/2003 | Cahill et al. |
| 2003/0118216 A1 | 6/2003 | Goldberg |
| 2003/0137597 A1 | 7/2003 | Sakamoto et al. |
| 2003/0142285 A1 | 7/2003 | Enomoto |
| 2003/0161506 A1 | 8/2003 | Velazquez et al. |
| 2003/0190072 A1 | 10/2003 | Adkins et al. |
| 2003/0194143 A1 | 10/2003 | Iida |
| 2003/0202715 A1 | 10/2003 | Kinjo |
| 2004/0017481 A1 | 1/2004 | Takasumi et al. |
| 2004/0027593 A1 | 2/2004 | Wilkins |
| 2004/0032512 A1 | 2/2004 | Silverbrook |
| 2004/0032526 A1 | 2/2004 | Silverbrook |
| 2004/0033071 A1 | 2/2004 | Kubo |
| 2004/0037460 A1 | 2/2004 | Luo et al. |
| 2004/0041924 A1 | 3/2004 | White et al. |
| 2004/0046878 A1 | 3/2004 | Jarman |
| 2004/0047491 A1 | 3/2004 | Rydbeck |
| 2004/0056975 A1 | 3/2004 | Hata |
| 2004/0057623 A1 | 3/2004 | Schuhrke et al. |
| 2004/0057705 A1 | 3/2004 | Kohno |
| 2004/0057715 A1 | 3/2004 | Tsuchida et al. |
| 2004/0090461 A1 | 5/2004 | Adams |
| 2004/0093432 A1 | 5/2004 | Luo et al. |
| 2004/0114796 A1 | 6/2004 | Kaku |
| 2004/0114797 A1 | 6/2004 | Meckes |
| 2004/0114829 A1 | 6/2004 | LeFeuvre et al. |
| 2004/0114904 A1 | 6/2004 | Sun et al. |
| 2004/0119851 A1 | 6/2004 | Kaku |
| 2004/0120598 A1 | 6/2004 | Feng |
| 2004/0125387 A1 | 7/2004 | Nagao et al. |
| 2004/0126086 A1 | 7/2004 | Nakamura et al. |
| 2004/0141657 A1 | 7/2004 | Jarman |
| 2004/0150743 A1 | 8/2004 | Schinner |
| 2004/0160517 A1 | 8/2004 | Iida |
| 2004/0165215 A1 | 8/2004 | Raguet et al. |
| 2004/0184044 A1 | 9/2004 | Kolb et al. |
| 2004/0184670 A1 | 9/2004 | Jarman et al. |
| 2004/0196292 A1 | 10/2004 | Okamura |
| 2004/0196503 A1 | 10/2004 | Kurtenbach et al. |
| 2004/0213476 A1 | 10/2004 | Luo et al. |
| 2004/0223063 A1 | 11/2004 | DeLuca et al. |
| 2004/0227978 A1 | 11/2004 | Enomoto |
| 2004/0228542 A1 | 11/2004 | Zhang et al. |
| 2004/0233299 A1 | 11/2004 | Ioffe et al. |
| 2004/0233301 A1 | 11/2004 | Nakata et al. |
| 2004/0234156 A1 | 11/2004 | Watanabe et al. |
| 2004/0239779 A1 | 12/2004 | Washisu |
| 2004/0240747 A1 | 12/2004 | Jarman et al. |
| 2004/0258308 A1 | 12/2004 | Sadovsky et al. |
| 2005/0001024 A1 | 1/2005 | Kusaka et al. |
| 2005/0013602 A1 | 1/2005 | Ogawa |
| 2005/0013603 A1 | 1/2005 | Ichimasa |
| 2005/0024498 A1 | 2/2005 | Iida et al. |
| 2005/0031224 A1 | 2/2005 | Prilutsky et al. |
| 2005/0041121 A1 | 2/2005 | Steinberg et al. |
| 2005/0046730 A1 | 3/2005 | Li |
| 2005/0047655 A1 | 3/2005 | Luo et al. |
| 2005/0047656 A1 | 3/2005 | Luo et al. |
| 2005/0053279 A1 | 3/2005 | Chen et al. |
| 2005/0058340 A1 | 3/2005 | Chen et al. |
| 2005/0058342 A1 | 3/2005 | Chen et al. |
| 2005/0062856 A1 | 3/2005 | Matsushita |
| 2005/0063083 A1 | 3/2005 | Dart et al. |
| 2005/0068452 A1 | 3/2005 | Steinberg et al. |
| 2005/0074164 A1 | 4/2005 | Yonaha |
| 2005/0074179 A1 | 4/2005 | Wilensky |
| 2005/0078191 A1 | 4/2005 | Battles |
| 2005/0117132 A1 | 6/2005 | Agostinelli |
| 2005/0129331 A1 | 6/2005 | Kakiuchi et al. |
| 2005/0134719 A1 | 6/2005 | Beck |
| 2005/0140801 A1 | 6/2005 | Prilutsky et al. |
| 2005/0147278 A1 | 7/2005 | Rui et al. |
| 2005/0151943 A1 | 7/2005 | Iida |
| 2005/0163498 A1 | 7/2005 | Battles et al. |
| 2005/0168965 A1 | 8/2005 | Yoshida |
| 2005/0196067 A1 | 9/2005 | Gallagher et al. |
| 2005/0200736 A1 | 9/2005 | Ito |
| 2005/0207649 A1 | 9/2005 | Enomoto et al. |
| 2005/0212955 A1 | 9/2005 | Craig et al. |
| 2005/0219385 A1 | 10/2005 | Terakawa |
| 2005/0219608 A1 | 10/2005 | Wada |
| 2005/0220346 A1 | 10/2005 | Akahori |
| 2005/0220347 A1 | 10/2005 | Enomoto et al. |
| 2005/0226499 A1 | 10/2005 | Terakawa |
| 2005/0232490 A1 | 10/2005 | Itagaki et al. |
| 2005/0238230 A1 | 10/2005 | Yoshida |
| 2005/0243348 A1 | 11/2005 | Yonaha |
| 2005/0275734 A1 | 12/2005 | Ikeda |
| 2005/0276481 A1 | 12/2005 | Enomoto |
| 2005/0280717 A1 | 12/2005 | Sugimoto |
| 2005/0286766 A1 | 12/2005 | Ferman |
| 2006/0008171 A1 | 1/2006 | Petschnigg et al. |
| 2006/0017825 A1 | 1/2006 | Thakur |
| 2006/0038916 A1 | 2/2006 | Knoedgen et al. |
| 2006/0039690 A1 | 2/2006 | Steinberg et al. |
| 2006/0045352 A1 | 3/2006 | Gallagher |

| | | | |
|---|---|---|---|
| 2006/0050300 A1 | 3/2006 | Mitani et al. | |
| 2006/0066628 A1 | 3/2006 | Brodie et al. | |
| 2006/0082847 A1 | 4/2006 | Sugimoto | |
| 2006/0093212 A1 | 5/2006 | Steinberg et al. | |
| 2006/0093213 A1 | 5/2006 | Steinberg et al. | |
| 2006/0093238 A1 | 5/2006 | Steinberg et al. | |
| 2006/0098867 A1 | 5/2006 | Gallagher | |
| 2006/0098875 A1 | 5/2006 | Sugimoto | |
| 2006/0119832 A1 | 6/2006 | Iida | |
| 2006/0120599 A1 | 6/2006 | Steinberg et al. | |
| 2006/0140455 A1 | 6/2006 | Costache et al. | |
| 2006/0150089 A1 | 7/2006 | Jensen et al. | |
| 2006/0203108 A1 | 9/2006 | Steinberg et al. | |
| 2006/0204052 A1 | 9/2006 | Yokouchi | |
| 2006/0204110 A1 | 9/2006 | Steinberg et al. | |
| 2006/0221408 A1 | 10/2006 | Fukuda | |
| 2006/0285754 A1 | 12/2006 | Steinberg et al. | |
| 2007/0110305 A1 | 5/2007 | Corcoran et al. | |
| 2007/0116379 A1 | 5/2007 | Corcoran et al. | |
| 2007/0116380 A1 | 5/2007 | Ciuc et al. | |
| 2007/0133863 A1 | 6/2007 | Sakai et al. | |
| 2007/0154189 A1 | 7/2007 | Harradine et al. | |
| 2007/0201724 A1 | 8/2007 | Steinberg et al. | |
| 2007/0263104 A1 | 11/2007 | DeLuca et al. | |
| 2007/0263928 A1 | 11/2007 | Akahori | |
| 2008/0002060 A1 | 1/2008 | DeLuca et al. | |
| 2008/0013798 A1 | 1/2008 | Ionita et al. | |
| 2008/0043121 A1 | 2/2008 | Prilutsky et al. | |
| 2008/0112599 A1 | 5/2008 | Nanu et al. | |
| 2008/0144965 A1 | 6/2008 | Steinberg et al. | |
| 2008/0186389 A1 | 8/2008 | DeLuca et al. | |
| 2008/0211937 A1 | 9/2008 | Steinberg et al. | |
| 2008/0232711 A1 | 9/2008 | Prilutsky et al. | |
| 2008/0240555 A1 | 10/2008 | Nanu et al. | |

FOREIGN PATENT DOCUMENTS

| | | | |
|---|---|---|---|
| EP | 911759 A2 | 4/1999 | |
| EP | 911759 A3 | 6/2000 | |
| EP | 1199672 A2 | 4/2002 | |
| EP | 1229486 A1 | 8/2002 | |
| EP | 1288858 A1 | 3/2003 | |
| EP | 1288859 A1 | 3/2003 | |
| EP | 1288860 A1 | 3/2003 | |
| EP | 1293933 A1 | 3/2003 | |
| EP | 1296510 A2 | 3/2003 | |
| EP | 1429290 A2 | 6/2004 | |
| EP | 1478169 A2 | 11/2004 | |
| EP | 1528509 A2 | 5/2005 | |
| EP | 979487 B1 | 3/2006 | |
| EP | 1429290 B1 | 7/2008 | |
| GB | 841609 A | 7/1960 | |
| GB | 2379819 A | 3/2003 | |
| JP | 3205989 A2 | 9/1991 | |
| JP | 4192681 A2 | 7/1992 | |
| JP | 5224271 A2 | 9/1993 | |
| JP | 7281285 A2 | 10/1995 | |
| JP | 9214839 A2 | 8/1997 | |
| JP | 2000-134486 A2 | 5/2000 | |
| JP | 2002-247596 A2 | 8/2002 | |
| JP | 2002-271808 A2 | 9/2002 | |
| JP | 2003-030647 A2 | 1/2003 | |
| WO | WO-9802844 A1 | 1/1998 | |
| WO | WO-9917254 A1 | 4/1999 | |
| WO | WO-9933684 A2 | 7/1999 | |
| WO | WO-0171421 A1 | 9/2001 | |
| WO | WO-0192614 A1 | 12/2001 | |
| WO | WO-0245003 A1 | 6/2002 | |
| WO | WO-03026278 A1 | 3/2003 | |
| WO | WO-03071484 A1 | 8/2003 | |
| WO | WO-2004034696 A1 | 4/2004 | |
| WO | WO-2005015896 A1 | 2/2005 | |
| WO | WO-2005041558 A1 | 5/2005 | |
| WO | WO-2005076217 A2 | 8/2005 | |
| WO | WO-2005076217 A3 | 8/2005 | |
| WO | WO-2005087994 A1 | 9/2005 | |
| WO | WO-2005109853 A1 | 11/2005 | |
| WO | WO-2006011635 A1 | 2/2006 | |
| WO | WO-2006018056 A1 | 2/2006 | |
| WO | WO-2006045441 A1 | 5/2006 | |
| WO | WO-2007057063 A1 | 5/2007 | |
| WO | WO-2007057064 A1 | 5/2007 | |
| WO | WO-2007093199 A2 | 8/2007 | |
| WO | WO-2007093199 A3 | 8/2007 | |
| WO | WO-2007095553 A2 | 8/2007 | |
| WO | WO-2007095553 A3 | 8/2007 | |
| WO | WO-2007142621 A1 | 12/2007 | |
| WO | WO-2008023280 A2 | 2/2008 | |
| WO | WO-2008109644 A2 | 9/2008 | |
| WO | WO-2008109644 A3 | 9/2008 | |
| WO | WO 2010/017953 A1 | 2/2010 | |
| WO | WO 2010/025908 A1 | 3/2010 | |

OTHER PUBLICATIONS

Corcoran, P. et al., "Automated In-Camera Detection of Flash-Eye Defects", IEEE Transactions on Consumer Electronics, 2005, pp. 11-17, vol. 51—Issue 1.

Cucchiara, R. at al., "Detection of Luminosity Profiles of Elongated Shapes", International Conference on Image Processing, 1996, pp. 635-638, vol. 3.

EPO Communication pursuant to Article 94(3) EPC, for European Patent Application No. 05 792 584.4, paper dated May 13, 2008, 8 pages.

European Patent Office, Communication pursuant to Article 94(3) EPC for Application No. 04763763.2, dated Mar. 7, 2008, 7 pages.

European Patent Office, Communication pursuant to Article 96(2) EPC for Application No. 04763763.2, dated Aug. 29, 2006, 4 pages.

Final Office Action mailed Sep. 1, 2009: for U.S. Appl. No. 11/841,855, filed Aug. 20, 2007.

Gaubatz, Matthew et al., "Automatic Red-Eye Detection and Correction", IEEE ICIP, Proceedings 2002 International Conference on Image Processing, 2002, pp. 1-804 1-807, vol. 2—Issue 3.

Han, T. et al "Detection and Correction of abnormal Pixels in Hyperion Images", IEEE Intl Symposium on Geoscience and Remote Sensing, 2002. pp. 1327-1330, vol. 3.

Iivarinen, J. et al., "Content-Based Retrieval of Defect Images, http://www.cs.tut.fi/.about.avisa/digger/Publications/acivs02.pdf", Proceedings of Advanced Concepts for Intelligent Vision, Lab. of Computer Information Science, 2002.

Ioffe, S., "Red eye detection with machine learning", Proceedings 2003 International Conference on Image Processing, 2003, pp. 871-874, vol. 2—Issue 3.

Ito, M., "An Automated System for LSI Fine Pattern Inspection Based on Comparison of Sem Images and Cad Data", IEEE International Conference on Robotics and Automation, 1995, pp. 544-549, vol. 1.

Jin, B. et al., "Modeling and Analysis of Soft-Test/Repair for CCD-Based Digital X-Ray Systems", Instrumentation and Measurement, IEEE Transactions, 2003, pp. 1713-1721, vol. 52—Issue 6.

Nguyen, Karlene et al., "Differences in the Infrared Bright Pupil Response of Human Eyes", Proceedings of the 2002 symposium on Eye tracking research & applications, 2002, pp. 133-138.

Non-Final Office Action mailed Aug. 31, 2009, for U.S. Appl. No. 11/462,035, filed Aug. 2, 2006.

Non-Final Office Action mailed Jul. 14, 2009, for U.S. Appl. No. 12/192,897, filed Aug. 15, 2008.

Non-Final Office Acton mailed Oct. 5, 2009, for U.S. Appl. No, 10/919,226, filed Aug 16, 2004.

Non-Final Office Action mailed Oct. 7, 2009, for U.S. Appl. No, 12/119,614, filed May 13, 2008.

Patent Abstracts of Japan, publication No. 2000050062, Image Input Device, application No. 10-217124, published Feb. 18, 2000, 1 page.

PCT International Preliminary Report on Patentability (IPRP) for PCT Application PCT/EP2005/011010, dated Jan. 23, 2007, 18 pages. cited by other.

PCT International Preliminary Report on Patentability for PCT Application No, PCT/EP2005/005907, dated Nov. 15, 2006, 8 pages.
PCT International Preliminary Report on Patentability for PCT Application PCT/EP2004/008706, dated Feb. 6, 2006, 7 pages.
PCT International Preliminary Report on Patentability for PCT Application PCT/EP2004/010199, dated Apr. 3, 2006, 7 pages.
PCT International Search Report and Written Opinion of the International Searching Authority for PCT Application No. PCT/EP2004/008706, dated Nov. 19, 2004, 13 pages.
PCT International Search Report and Written Opinion of the International Searching Authority for PCT Application No. PCT/EP2005/005033, dated Aug. 4, 2005, 13 pages.
PCT Notification Concerning Transmittal of International Preliminary Report on Patentability, for PCT Application No. PCT/US2007/062090, dtd Aug. 28, 2008, 6 pages.
PCT Notification of Transmittal of the International Search Report and the Written Opinion of the International Searching Authority, or the Declaration (PCT/EP2006/008342), dated Dec. 28, 2006.
PCT Notification of Transmittal of the International Search Report and the Written Opinion of the International Searching Authority, or the Declaration for PCT Application No. PCT/US07/62090 issued Mar. 10, 2008, 10 pages.
PCT Notification of Transmittal of the International Search Report and the Written Opinion of the International Searching Authority, or the Declaration for PCT/EP/2005/011010, dated Jan. 23, 2006, 14 pages.
PCT Notification of Transmittal of the International Search Report and the Written Opinion of the International Searching Authority, or the Declaration for PCT/EP/2005/05907, dated Aug. 1, 2005, 12 pages.
PCT Notification of Transmittal of the International Search Report and the Written Opinion of the International Searching Authority, or the Declaration, for PCT Application No. PCT/EP2006/008358, Dec. 5, 2006, 14 pages.
PCT Notification of Transmittal of the International Search Report and the Written Opinion of the International Searching Authority, or the Declaration, for PCT Application No. PCT/US2008/055964, paper dated Jul. 30, 2008, 8 Pages.
PCT Notification of Transmittal of the International Search Report and the Written Opinion of the International Searching Authority, or the Declaration, for PCT/EP2004/010199, paper dated Dec. 13, 2004, 13 pages.
PCT Notification of Transmittal of the International Search Report and Written Opinion of the International Searching Authority for PCT Application No. PCT/EP2005/001171, dated Jan. 27, 2006, 11 pages.
PCT Partial International Search Report for Application No. PCT/EP2009/051081 dated Apr. 29, 2009, 7 pages.
Plotnikov, Yuri et al., "Advanced Image Processing for Defect Visualization in Infrared Thermography, http://citeseer.ist.psu.edu/plotnikov98advanced.html", NASA Langley Research Center, M.S. Posted: ACM Portal, 1998.
Plotnikov, Yuri et al., Winfree, "Visualization of Subsurface Defects in Composites Using a Focal Plane Array Infrared Camera, http://citeseer.ist.psu.edu/357066,html", NASA Langley Research Center, 1999.
Sahba, F. et al., "Filter Fusion for Image Enhancement Using Reinforcement Learning, XP010654204, ISBN: 0-7803-7781-8", Canadian Conference on Electrical and computer Engineering, 2003, pp. 847-850, vol. 3.
Shen, Jianhong, "Inpainting and the Fundamental Problem of Image Processing", 2002, 6 pages.
Smolka, B. et al., "Towards Automatic Redeye Effect Removal, XP004416063", Pattern Recognition Letters, 2003, pp. 1767-1785, vol. 24—Issue 11, North-Holland Publ.
Soriano, M. et al., "Making Saturated Facial Images Useful Again, XP002325961, ISSN: 0277-786X", Proceedings of the SPIE, 1999, pp. 113-121, vol. 3826.
Tan, Yap-peng et al., "Robust Sequential Approach for the Detection of Defective Pixels in an Image Sensor, http:// ieeexplorejeee.org/search/freesrchabstractjsp?arnumber=758382&isnumber=16342&punumber=6110&k2dockey=758382©ieeecnfs&query=%28%28%28%28images+and+defects+and+correction%29%29%29%29+%3Cin%3E", IEEE International Conference on Acoustics, Speech, and Signal Processing, 1999, pp. 2239-2242, vol. 4.

Toet, A., "Multiscale Color Image Enhancement, Posted online: 200208-06 18:09:24.0 http://ieeexplore.ieee.org/search/freesrch abstract.jsp? arnumber=146865&isnumber=3917&punumber=1197&k2dockey=146865©ieeecnfs&query=%28%28images+and+defects+and+luminance%29%29+%3Cin%3E+metadata&pos=1", International Conference on Image Processing and its Applications, 1992, pp. 583-585.
Translation of Hiroshi et al. JP05-224271, Mar. 1993, Japan Publication.
U.S. Appl. No. 10/772,787, filed Feb. 4, 2004, by inventors Michael J. DeLuca, et al.
U.S. Appl. No. 10/170,511, filed Jun. 12, 2002, inventor Michael J. DeLuca.
U.S. Appl. No. 11/217,788, filed Aug. 30, 2005, inventors Eran Steinberg, et al.
United Kingdom Search Report dated May 22, 2007, issued in Application No. GB 0701957.3.
Willamowski, J. et al., "Probabilistic Automatic Red Eye Detection and Correction", The 18th International Conference on Pattern Recognition (ICPR'06), 2006, pp. 762-765, vol. 3, IEEE Computer Society.
Agrawal A. et al., "Removing photography artifacts using gradient projection and flash-exposure sampling" ACM Transactions on Graphics, 2005, pp. 828-835.
Final Office Action mailed Apr. 26, 2010, for U.S. Appl. No. 10/773,092, filed Feb. 4, 2004.
Final Office Action mailed Apr. 26, 2010, for U.S. Appl. No. 11/690,834, filed Mar. 25, 2007.
Final Office Action mailed Apr. 26, 2010, for U.S. Appl. No. 11/772,427, filed Feb. 2, 2007.
Final Office Action mailed Apr. 26, 2010, for U.S. Appl. No. 12/035,416, filed Feb. 21, 2008.
Final Office Action mailed Mar. 24, 2010, for U.S. Appl. No. 11/462,035, filed Aug. 2, 2006.
Final Office Action mailed Nov. 20, 2009, for U.S. Appl. No. 12/192,897, filed Aug. 15, 2008.
Non-Final Office Action mailed Aug. 30, 2010, for U.S. Appl. No. 11/841,855, filed Aug. 20, 2007.
Non-Final Office Action mailed Aug. 5, 2010, for U.S. Appl. No. 11/462,035, filed Aug. 2, 2006.
Non-Final Office Action mailed May 3, 2010, for U.S. Appl. No. 12/187,763, filed Aug. 7, 2008.
Non-Final Office Action mailed May 4, 2010, for U.S. Appl. No. 12/192,335, filed Aug. 15, 2008.
Non-Final Office Action mailed Oct. 29, 2009, for U.S. Appl. No. 12/194,148, filed Aug. 19, 2008.
Non-Final Office Action mailed Sep. 17, 2010, for U.S. Appl. No. 11/690,834, filed Mar. 25, 2007.
Non-Final Office Action mailed Sep. 21, 2010, for U.S. Appl. No. 10/773,092, filed Feb. 4, 2004.
Notice of Allowance mailed Feb. 1, 2010, for U.S. Appl. No. 10/919,226, filed Aug. 16, 2004.
Notice of Allowance mailed Feb. 19, 2010, for U.S. Appl. No. 12/119,614, filed May 13, 2008.
Notice of Allowance mailed Feb. 19, 2010, for U.S. Appl. No. 12/194,148, filed Aug. 19, 2008.
Notice of Allowance mailed Jun. 27, 2010, for U.S. Appl. No. 12/192,897, filed Aug. 15, 2008.
Notice of Allowance mailed Nov. 18, 2009, for U.S. Appl. No. 11/282,954, filed Nov. 18, 2005.
Notice of Allowance mailed Oct 15, 2010, for U.S. Appl. No. 11/554,539, filed Oct. 30, 2006.
PCT Notification of Transmittal of the International Search Report and the Written Opinion of the International Searching Authority, or the Declaration, for PCT Application No. PCT/EP2009/005809, dated Nov. 24, 2009, 12 pages.
PCT Notification of Transmittal of the International Search Report and the Written Opinion of the International Searching Authority, or the Declaration, for PCT Application No. PCT/EP2009/006361, dated Nov. 24, 2009, 10 pages.
Tatsutoshi Kitajima (JP04-192681 English Translation; Electronic Camera, Jul. 10, 1992).

* cited by examiner

METHOD AND APPARATUS OF CORRECTING HYBRID FLASH ARTIFACTS IN DIGITAL IMAGES

CROSS-REFERENCE TO RELATED APPLICATIONS

This application is a continuation of U.S. patent application Ser. No. 11/282,955, filed on Nov. 18, 2005, now U.S. Pat. No. 7,599,577, entitled, "Method and Apparatus of Correcting Hybrid Flash Artifacts in Digital Images."

BACKGROUND

1. Field of the Invention

The present invention relates to digital image correction, and particularly to correction of eye artifacts due to flash exposure.

2. Description of the Related Art

U.S. Pat. No. 6,873,743 to Steinberg, which is hereby incorporated by reference, discloses an automatic, red-eye detection and correction system for digital images including a red-eye detector module that determines without user intervention if a red-eye defect exists. If a defect is located in an image the portion of the image surrounding the defect is passed to a correction module that de-saturates the red components of the defect while preserving the other color characteristics of the defect region.

WO03/071484, Pixology, discloses a method of detecting red-eye features in a digital image comprising identifying highlight i.e. glint regions of the image having pixels with a substantially red hue and higher saturation and lightness values than pixels in the regions thereround. In addition, pupil regions comprising two saturation peaks either side of a saturation trough may be identified. It is then determined whether each highlight or pupil region corresponds to part of a red-eye feature on the basis of further selection criteria, which may include determining whether there is an isolated, substantially circular area of correctable pixels around a reference pixel. Correction of red-eye features involves reducing the lightness and/or saturation of some or all of the pixels in the red-eye feature.

In many cases, the eye-artifact that is caused by the use of flash is more complex than a mere combination of red color and a highlight glint. Such artifacts can take the form of a complex pattern of hybrid portions that are red and other portions that are yellow, golden, white or a combination thereof. One example includes the case when the subject does not look directly at the camera when a flash photograph is taken. Light from the flash hits the eye-ball at an angle which may provoke reflections different than retro-reflection, that are white or golden color. Other cases include subjects that may be wearing contact lenses or subjects wearing eye glasses that diffract some portions of the light differently than others. In addition, the location of the flash relative to the lens, e.g. under the lens, may exacerbate a split discoloration of the eyes.

SUMMARY OF THE INVENTION

A technique is provided for digital image artifact correction as follows. A digital image is acquired. A candidate red-eye defect region is identified in the image. A region of high intensity pixels is identified which has at least a threshold intensity value in a vicinity of said candidate red-eye region. An eye-related characteristic of a combined hybrid region is analyzed. The combined hybrid region includes the candidate red-eye region and the region of high intensity pixels. The combined hybrid region is identified as a flash artifact region based on the analyzing of the eye-related characteristic. Flash artifact correction is applied to the flash artifact region.

The flash artifact correction may include red-eye correction of the candidate red-eye region. The flash artifact correction may also include correction of the region of high intensity pixels.

A bounding box may be defined around the candidate red-eye defect region. The identifying of the region of high intensity pixels may comprise identifying a seed high intensity pixel by locating said seed high intensity pixel within said bounding box. The seed pixel may have a yellowness above a pre-determined threshold and a redness below a pre-determined threshold. The region of high intensity pixels may be defined around the seed pixel.

The analyzing may include calculating a difference in roundness between the candidate red-eye region and the combined region. The red-eye correction may be applied when the roundness of the combined hybrid region is greater than a threshold value.

The method may include determining to apply red-eye correction when a roundness of the combined hybrid region is greater than a roundness of the candidate red-eye region by a threshold amount.

The method may include determining to not apply correction when the region of high intensity pixels includes greater than a threshold area. The area may be determined as a relative function to the size of said bounding box.

The method may include determining a yellowness and a non-pinkness of the region of high intensity pixels. The acquired image may be in LAB color space, and the method may include measuring an average b value of the region of high intensity pixels and determining a difference between an average a value and the average b value of the region of high intensity pixels.

The analyzing may include analyzing the combined hybrid region for the presence of a glint, and responsive to detecting a glint, determining to not correct the region of high intensity pixels responsive to the presence of glint.

The method may include correcting the region of high intensity pixels by selecting one or more pixel values from a corrected red-eye region and employing the pixel values to correct the region of high intensity pixels. The selected pixel values may be taken from pixels having L and b values falling within a median for the corrected red-eye region.

The method may include determining to not apply correction when an average b value of the region of high intensity pixels exceeds a relatively low threshold or if a difference between average a and b values is lower than a pre-determined threshold.

The method may include converting the acquired image to one of RGB, YCC or Lab color space formats, or combinations thereof.

The analyzing of the acquired image may be performed in Luminance chrominance color space and the region of high intensity pixels may have a luminance value greater than a luminance threshold, and blue-yellow chrominance values greater than a chrominance threshold and a red-green value less than a red-green threshold.

The method may include filtering the red-eye candidate regions to confirm or reject said regions as red-eye defect regions, and selecting a subset of the rejected red-eye candidate regions.

The method may be implemented within a digital image acquisition device. The method may be implemented as part of an image acquisition process. The method may be implemented as part of a playback option in the digital image acquisition device.

The method may be implemented to run as a background process in a digital image acquisition device. The method may be implemented within a general purpose computing device and wherein the acquiring may include receiving the digital image from a digital image acquisition device.

The candidate red-eye region and/or the region of high intensity pixels may be corrected. The region of high intensity pixels may be corrected after the red-eye candidate region. The correcting of the region of high intensity pixels may utilize corrected pixel values based on the candidate red-eye region. Results of correcting the candidate red-eye region and the region of high intensity pixels may be combined in such a manner as to obfuscate a seam between the regions. The method may include smoothing a seam region between the candidate red-eye region and the region of high intensity pixels.

The eye-related characteristic may include shape, roundness, and/or relative pupil size.

A further method is provided for digital image artifact correction. A digital image is acquired. A candidate red-eye defect region is identified in the image. A seed pixel is identified which has a high intensity value in the vicinity of the candidate red-eye region. An eye-related characteristic of a combined hybrid region is analyzed. The combined hybrid region includes the candidate red-eye region and the seed pixel. The combined hybrid region is identified as a flash artifact region based on the analyzing of the eye-related characteristic. Flash artifact correction is applied to the flash artifact region.

The flash artifact correction may include red-eye correction of the candidate red-eye region. The flash artifact correction may also include correction of a second region that includes the seed pixel.

The seed pixel may have a yellowness above a pre-determined threshold and a redness below a pre-determined threshold.

The method may include filtering the red-eye candidate regions to confirm or reject the regions as red-eye defect regions, and selecting a subset of the rejected red-eye candidate regions.

The method may be implemented within a digital image acquisition device. The method may be implemented as part of an image acquisition process. The method may be implemented as part of a playback option in the digital image acquisition device.

The method may be implemented to run as a background process in a digital image acquisition device. The method may be implemented within a general purpose computing device, and the acquiring may include receiving the digital image from a digital image acquisition device. The analyzing may include checking whether an average b value exceeds a relatively low threshold. The analyzing may include checking whether a difference between an average a value and the average b value is lower than a given threshold.

BRIEF DESCRIPTION OF THE DRAWINGS

Embodiments of the invention will now be described by way of example with reference to the accompanying drawings, in which.

DETAILED DESCRIPTION OF THE PREFERRED EMBODIMENTS

The preferred embodiments provide improved methods for detecting defects in subjects' eyes as well as methods for correcting such defects.

A preferred embodiment may operate by examining a candidate red eye region, looking in its neighborhood or vicinity for a possible yellow, white and/or golden patch belonging to the same eye, and, if any, under certain conditions correcting one or both of the red-eye or golden patch.

Using a technique in accordance with a preferred embodiment, the quality and acceptability of automatic eye correction can be increased for half red-half white/golden defects.

Implementations of the preferred embodiments can take advantage of the red part of the eye defect being detected by one automatic red-eye detection processing method, perhaps utilizing a conventional technique or a new technique, so the detection of the non-red regions can be applied as a pre-correction stage, and so that this method may take full advantage of existing or new detection methods. The correction parts of such red-eye processing may be altered to implement a technique in accordance with a preferred embodiment, while non correction parts preferably are not altered.

A technique in accordance with a preferred embodiment may provide a qualitative improvement in image correction with relatively little processing overhead making it readily implemented in cameras that may have limited processing capability and/or without unduly effecting the camera click-to-click interval.

It will be seen that pixels belonging to a red-eye defect may be corrected by reducing the red value of the pixel. As an example, image information may be available in Lumniance-Chrominance space such as L*a*b* color space. This may involve reducing the L* and a* value of a pixel to a suitable level. In many cases, reduction of the a* value may automatically restore the chrominance of the eye thus restoring a true value of the iris.

However, for white/golden pixels of a half red-half white/golden eye defect, the L and possibly b characteristics of the pixel may also be either saturated and/or distorted. This means that unlike red eye defects, in these cases the original image information may be partially or even totally lost. The correction may be performed by reducing the overall L* value as well as reduction of the a* and b*. However, because l* may be very high, the chrominance may be very low, thus there may not be significant color information remaining. In an additional preferred embodiment, correction of the white/golden portion of the defect involves reconstricting the eye, as opposed to the restoration described above from information from the corrected red eye portion of the defect.

Figure 3:
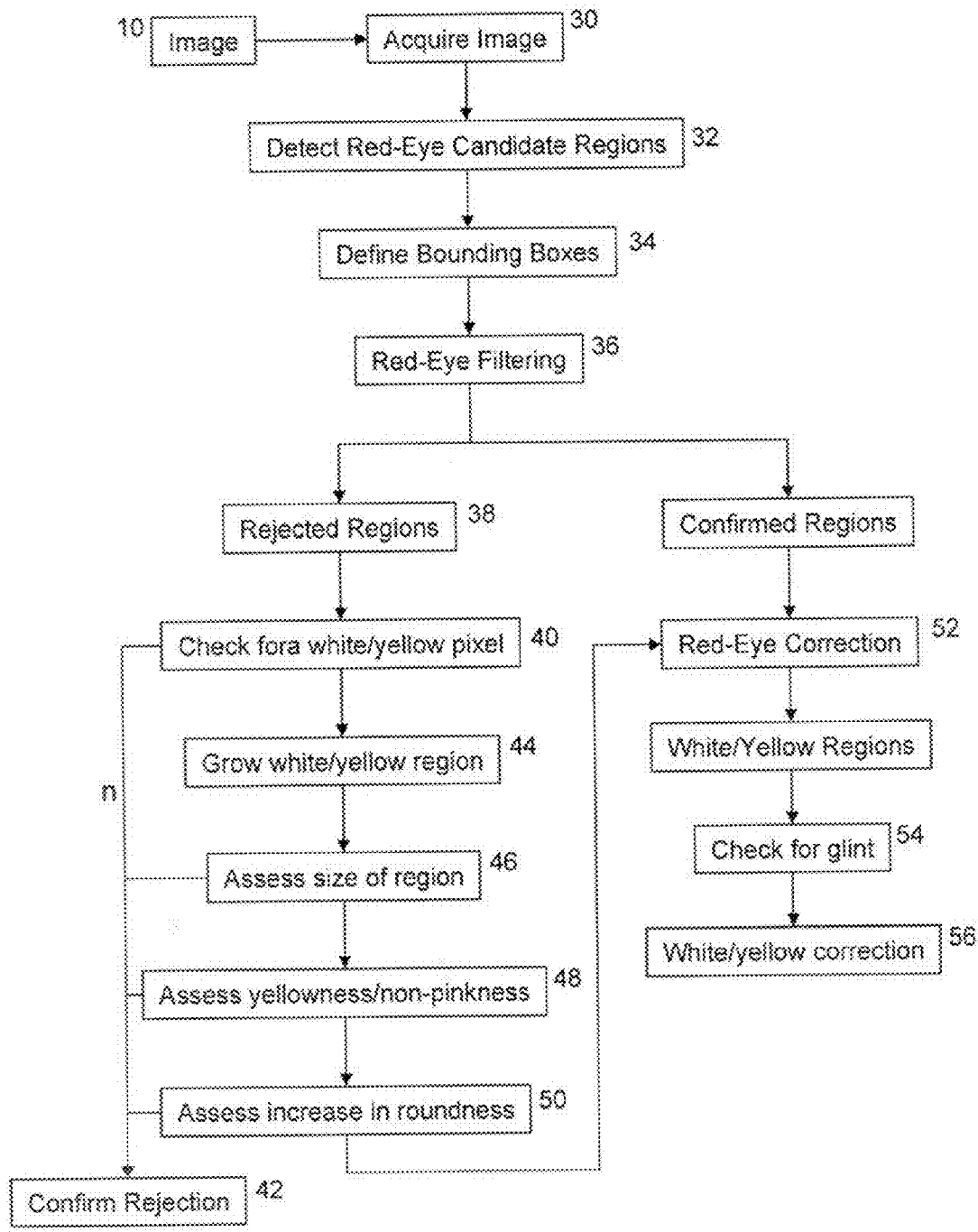
FIG. 3 illustrates a flow diagram of an embodiment of image connection software according to the present invention.

Referring now to FIG. 3, a digital image 10 may be acquired 30 in an otherwise conventional manner and/or utilizing some innovative technique. Where the embodiment is implemented in a device separate from a device such as a camera or scanner on which the image was originally acquired, the image may be acquired through file transfer by another suitable means including wired or wireless peer-to-peer or network transfer. Otherwise the image correction process described below, if suitably speed optimized, can either be implemented within the image acquisition chain of the image acquisition device for displaying a corrected image to a user before the user chooses to save and/or acquire a subsequent image; or alternatively, the image correction process can be analysis optimized to operate in the background on the image acquisition device on images which have been stored previously.

Figure 1:
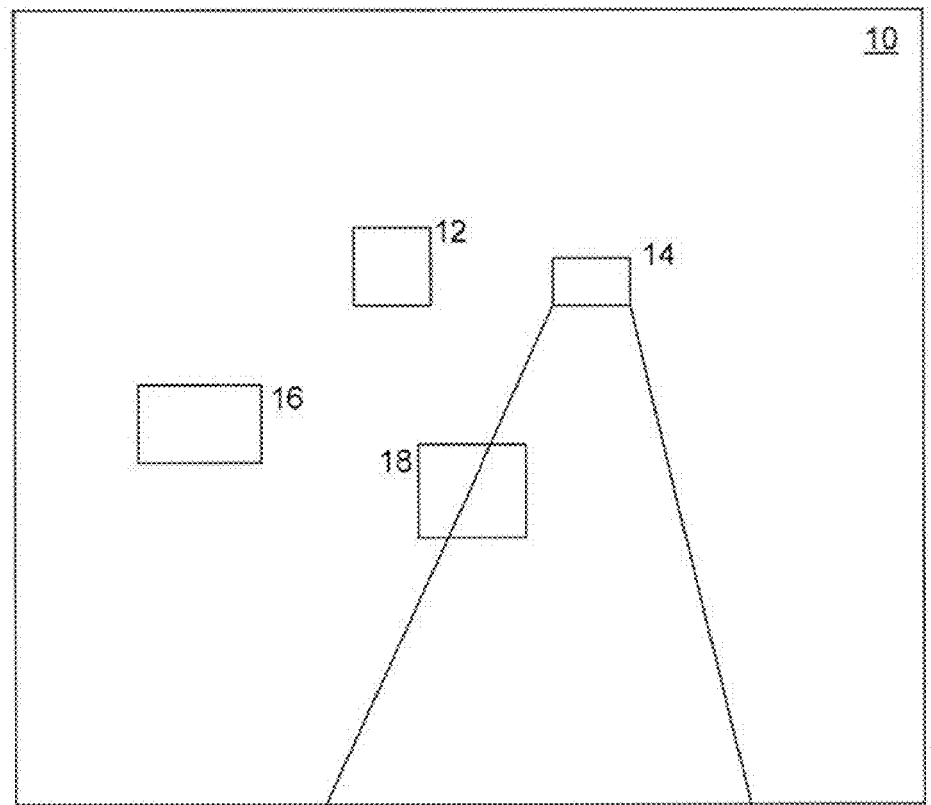
FIG. 1 illustrates an image in which several defect candidate regions have been identified and surrounded by bounding boxes.

Next, during red-eye detection 32, red-pixels 20 are identified and subsequently grouped into regions 22 comprising a plurality of contiguous (or generally contiguous) pixels (see, e.g., FIG. 2). These regions can be associated 34 with larger bounding box regions 12,14,16,18 (see, e.g., FIG. 1). The candidate regions contained within these bounding boxes are then passed through a set of filters 36 to determine whether the regions are in fact red-eye defects or not. Examples of such falsing filters are disclosed in U.S. Pat. No. 6,873,743.

Figure 2:
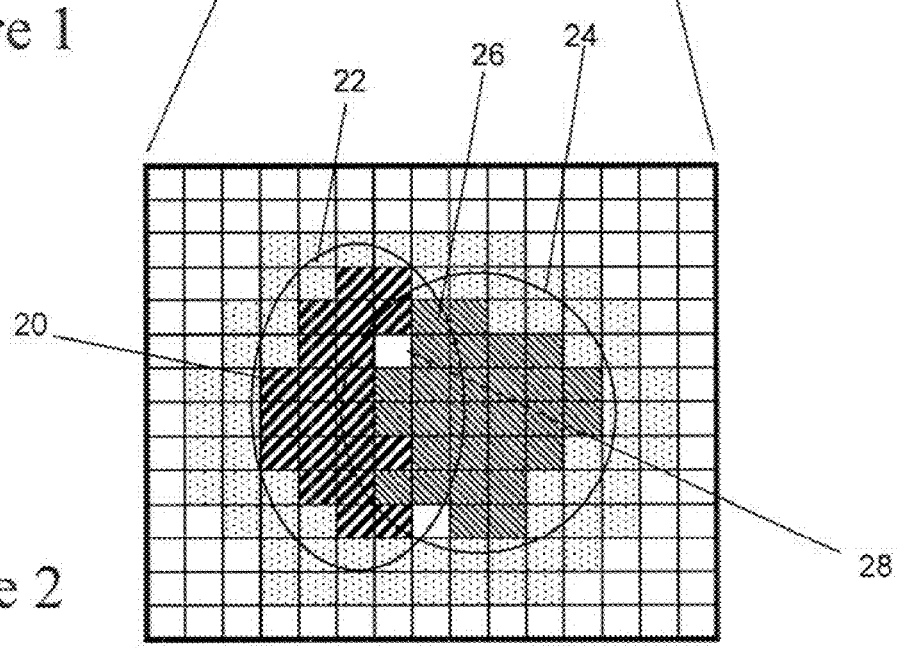
FIG. 2 shows in more detail a candidate region exhibiting a half-red half-white/golden defect.

One possible reason a filtering process might reject a candidate region, such as a region of red-pixels 20 as illustrated at FIG. 2, is that it lacks the roundness expected of a typical red-eye defect. Such regions as well as regions failed for other suitable reasons may be preferably passed as rejected regions 38 for further processing to determine if they include a half red—half white/golden eye defect—and if so for the defect to be corrected accordingly. Much of the operation of this processing can be performed in parallel with other red-eye processing (in for example a multi-processing environment) or indeed processing for each rejected region could be carried out to some extent in parallel.

Processing in accordance with an exemplary embodiment which may be involved in checking for half red-half white/golden eye defects is outlined in more detail as follows:

1. The bounding box 12-18 of an already detected red part of the eye artifact is searched 40 for a point, say 26 (see FIG. 2) having:
    a. High intensity (I>threshold)
    b. High yellowness (b>threshold)
    c. Low redness (a<threshold)

In this example, it is assumed that the image information for a region is available in Lab color space, although another embodiment could equally be implemented for image information in other formats such as RGB, YCC or indeed bitmap format.

If such a point does not exist, then STOP (i.e., the decision is taken that no white/golden patch exists in the vicinity of the red area) and confirm that the region is to be rejected 42.

2. Starting from a point detected in Step 40, grow 44 a region 24 (see FIG. 2) based on luminance information, for example, if luminance is greater than a threshold, a point is added to the white/golden region 24. If the region 24 exceeds a predefined maximum allowable size, step 46, then STOP and confirm that the region is to be rejected 42. The maximum allowable size can be determined from a ratio of the bounding box area vis-à-vis the overall area of the red 22 and white/golden region 24.

3. Yellowness and non-pinkness of the white region are then assessed 48 by checking that average h value exceeds a relatively low threshold, and the difference between average "a" and average "b" is lower than a given threshold. If at least one test fails, then STOP and confirm that the region is to be rejected 42.

4. In this embodiment, the increase of roundness of the combination of initial red 22 and detected white/golden regions 24 from the original red region 22 is checked 50. Thus, the roundness of the union of the red and white/golden regions is computed and compared with that of the red region 22. If roundness is less than a threshold value or decreased or not increased sufficiently by "adding" the white/golden region 24 to the red one 22, then STOP and reject the region 42. Roundness of a region is preferably computed using the formula $$\text{Roundness} = \frac{\text{Perimeter}^2}{4\pi \cdot \text{Area}}$$

Prior to assessing roundness, a hole filling procedure is preferably applied to each region 22,24 to include for example pixel 28 within the union.

5. If the region passes one or more and preferably all of the above tests, it is added to the list of confirmed red-eye regions. At this point, the red part of the eye defect can be corrected 52 in any of various manners, for example, by reducing the a value of pixels in Lab color space, while the pixels that were corrected are marked to be used in further processing.

6. For white/golden regions that were added to the list of red-eye defect regions, further correction of the white/golden portion of the defect can be applied, after some further checks. One such check is to detect glint 54. In RGB space, glint candidates are selected as high luminance pixels (for example, min(R, G)>=220 and max(R, G)==255). If a very round (e.g, in one or both of aspect ratio and elongation), luminous, and desaturated region is found within the interior of the current "red ∪ white" region 22,24, its pixels may be removed from the "pixels-to-correct" list. The glint may be the entire high luminance region but in most cases only a small part of the high luminance region will satisfy the criteria for glint pixels.

7. Where a glint is not detected or is small relative to the size of the white/golden region, the non-red eye artifact pixels 24 can be corrected 56 preferably taking color information from red pixels 22 which where already corrected at step 52, if such information after the correction exists. Alternatively, the correction can be done by reduction of the Luminance value. In the preferred embodiment, color information is derived from a selection of ex-red pixels with L and b values which lie in the median for that region (between the 30% and 70% points on a cumulative histogram for L and b). These color samples (from the already corrected red part of the eye) are used to create the same texture on both the red and non-red defect parts of the eye. It should be noted that the L and b histograms may be generally available from preprocessing steps, for example, those for determining various thresholds, and won't necessarily have changed during correction as the red correction may just involve reducing the a value of a pixel. It is possible that the correction of the red-eye region and the one for the high intendity region may show an unpleasant seam between the regions. In an alternative embodiment, the corrected region will be smoothed in such a manner that the seams between the two regions if exsit, will be eliminated.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, are hereby incorporated by reference into the detailed description of the preferred embodiments as disclosing alternative embodiments and components.

The invention claimed is:

1. A digital camera, comprising:
   (a) a lens;
   (b) an image sensor;
   (c) a processor and
   (d) a computer readable medium having computer readable code embodied therein for programming the processor to perform a method of digital image artifact correction, the method comprising:
      acquiring a digital image, including capturing a digital image using the lens and
      the image sensor or receiving a digital image captured by an optical system of another device, or combinations thereof;
      identifying a candidate red-eye defect region in said image;
      identifying a region of high intensity pixels having at least a threshold intensity value within a sub-region of the image that also includes the candidate red-eye region;
      analyzing an eye-related characteristic of the sub-region that comprises a combined hybrid region including said candidate red-eye region and said region of high intensity pixels;
      identifying said combined hybrid region as a flash artifact region based on said analyzing of said eye-related characteristic; and
      applying flash artifact correction to said flash artifact region.

2. The digital camera of claim 1, the method further comprising defining a bounding box around said candidate red-eye defect region.

3. The digital camera of claim 1, wherein identifying said region of high intensity pixels comprises identifying a seed high intensity pixel by locating said seed high intensity pixel within said bounding box.

4. The digital camera of claim 3, wherein said seed pixel has a yellowness above a pre-determined threshold and a redness below a pre-determined threshold.

5. The digital camera of claim 3, the method further comprising defining said region of high intensity pixels around said seed pixel.

6. The digital camera of claim 5, wherein said analyzing comprises calculating a difference in roundness between said candidate red-eye region and said combined region.

7. The digital camera of claim 6, wherein said red-eye correction is applied when said roundness of the combined hybrid region is greater than a threshold value.

8. The digital camera of claim 6, the method further comprising determining to apply said red-eye correction when a roundness of the combined hybrid region is greater than a roundness of the candidate red-eye region by a threshold amount.

9. The digital camera of claim 5, the method further comprising determining to not apply correction when said region of high intensity pixels comprises greater than a threshold area.

10. The digital camera of claim 9, wherein said area is determined as a relative function to a size of said bounding box.

11. The digital camera of claim 5, the method further comprising determining a yellowness and a non-pinkness of said region of high intensity pixels.

12. The digital camera of claim 11, wherein said acquired image is in LAB color space, and wherein the method further comprises measuring an average b value of said region of high intensity pixels and determining a difference between an average a value and the average b value of said region of high intensity pixels.

13. The digital camera of claim 5, wherein said analyzing further comprises analyzing said combined hybrid region for the presence of a glint, and determining to not correct said region of high intensity pixels responsive to the presence of glint.

14. The digital camera of claim 5, the method further comprising correcting said region of high intensity pixels by selecting one or more pixel values from a corrected red-eye region and employing said pixel values to correct said region of high intensity pixels.

15. The digital camera of claim 14, wherein said selected pixel values are taken from pixels having L and b values falling within a median for the corrected red-eye region.

16. The digital camera of claim 1, the method further comprising determining to not apply correction when an average b value of said region of high intensity pixels exceeds a relatively low threshold or if a difference between average a and b values is lower than a pre-determined threshold.

17. The digital camera of claim 1, the method further comprising converting said acquired image to one of RGB, YCC or Lb color space formats, or combinations thereof.

18. The digital camera of claim 1, wherein said analyzing of said acquired image is performed in Luminance chrominance color space and said region of high intensity pixels has a luminance value greater than a luminance threshold, and blue-yellow chrominance values greater than a chrominance threshold and a red-green value less than a red-green threshold.

19. The digital camera of claim 1, the method further comprising:
   filtering said red-eye candidate regions to confirm or reject said regions as red-eye defect regions; and
   selecting a subset of said rejected red-eye candidate regions for analysis as hybrid regions.

20. The digital camera of claim 1, the method being implemented as part of an image acquisition process.

21. The digital camera of claim 1, the method being implemented as part of a playback option in said digital camera.

22. The digital camera of claim 1, the method being implemented to run as a background process in said digital camera.

23. The digital camera of claim 1, the method being implemented within a general purpose computing device and wherein said acquiring comprises receiving said digital image from said digital camera.

24. The digital camera of claim 1, wherein said flash artifact correction includes red eye correction of said candidate red-eye region.

25. The digital camera of claim 24, wherein said flash artifact correction further comprises correction of said region of high intensity pixels.

26. The digital camera of claim 24, wherein correcting said region of high intensity pixels comprises using corrected pixel values based on said candidate red-eye region.

27. The digital camera of claim 24, wherein results of correcting said candidate red-eye region and said region of high intensity pixels are combined in such a manner as to obfuscate a seam between the regions.

28. The digital camera of claim 24, the method further comprising smoothing a seam region between said candidate red-eye region and said region of high intensity pixels.

29. The digital camera of claim 1, wherein said eye-related characteristic comprises shape.

30. The digital camera of claim 1, wherein said eye-related characteristic comprises roundness.

31. The digital camera of claim 1, wherein said eye-related characteristic comprises relative pupil size.

32. A digital camera, comprising:
(a) a lens,
(b) an image sensor,
(c) a processor and
(d) a computer readable medium having computer readable code embodied therein for programming the processor to perform a method of digital image artifact correction, the method comprising:
  acquiring a digital image, including capturing a digital image using the lens and the image sensor or receiving a digital image captured by an optical system of another device, or combinations thereof;
  identifying a candidate red-eye defect region in said image;
  identifying a seed pixel having a high intensity value within a sub-region of the image that also includes the candidate red-eye region;
  analyzing an eye-related characteristic of the sub-region that comprises a combined hybrid region including said candidate red-eye region and said seed pixel;
  identifying said combined hybrid region as a flash artifact region based on said analyzing of said eye-related characteristic; and
  applying flash artifact correction to said flash artifact region.

33. The digital camera of claim 32, wherein said seed pixel has a yellowness above a pre-determined threshold and a redness below a pre-determined threshold.

34. The digital camera of claim 32, the method further comprising:
  filtering said red-eye candidate regions to confirm or reject said regions as red-eye defect regions; and
  selecting a subset of said rejected red-eye candidate regions for analysis as hybrid regions.

35. The digital camera of claim 32, the method being implemented as part of an image acquisition process.

36. The digital camera of claim 32, the method being implemented as part of a playback option in said digital camera.

37. The digital camera of claim 32, the method being implemented to run as a background process in said digital camera.

38. The digital camera of claim 32, the method being implemented within a general purpose computing device and wherein said acquiring comprises receiving said digital image at said digital camera.

39. The digital camera of claim 32, wherein the analyzing comprises checking whether an average b value exceeds a relatively low threshold.

40. The digital camera of claim 39, wherein the analyzing comprises checking whether a difference between an average a value and the average b value is lower than a given threshold.

41. The digital camera of claim 32, wherein said flash artifact correction includes red eye correction of said candidate red-eye region.

42. The digital camera of claim 32, wherein said flash artifact correction further comprises correction of a second region that includes said seed pixel.

* * * * *